Sept. 11, 1962 R. L. BAUER 3,053,334
STABILIZER FOR CRAWLER-MOUNTED VEHICLES
Filed April 20, 1960
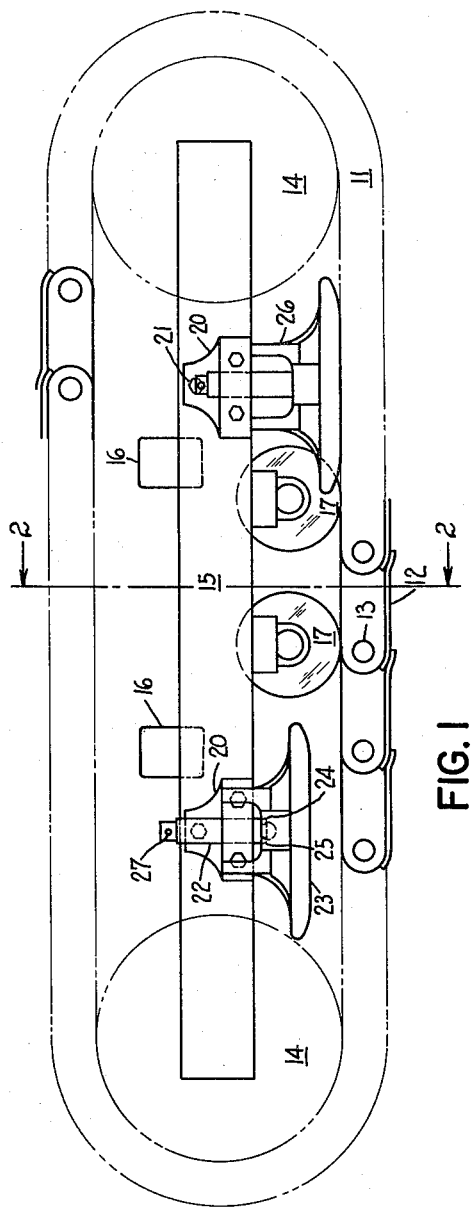
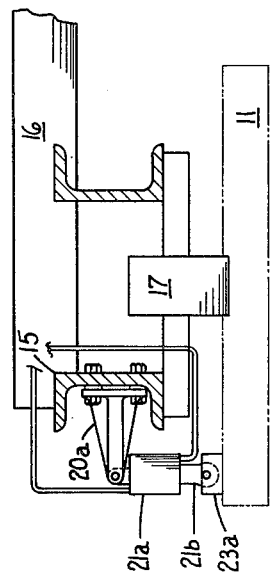
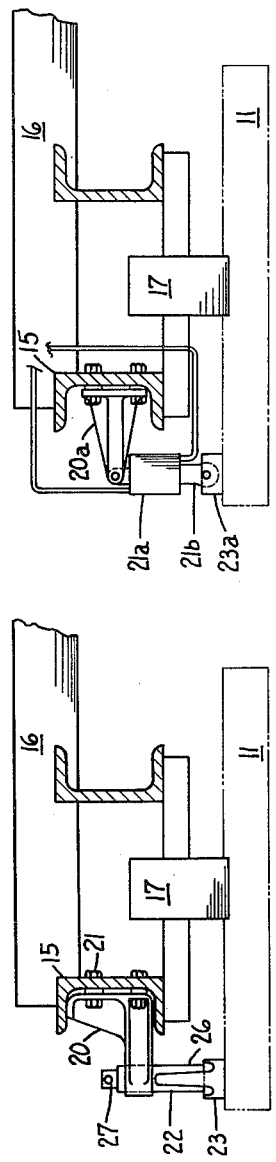
INVENTOR.
BY RALPH L. BAUER
ATTORNEY United States Patent Office 3,053,334
Patented Sept. 11, 1962

3,053,334
STABILIZER FOR CRAWLER-MOUNTED
VEHICLES
Ralph L. Bauer, Indianapolis, Ind., assignor to Bucyrus-Erie Company, South Milwaukee, Wis., a corporation of Delaware
Filed Apr. 20, 1960, Ser. No. 23,493
3 Claims. (Cl. 180—9.2)

This invention relates to a stabilizer for vehicles mounted on endless crawler-type traction belts. In particular, it relates to stabilizers for such vehicles which are subjected to a force tending to tip the vehicle sideways.

Examples of such vehicles are crawler-mounted cranes which have their booms disposed normal to the longitudinal axis of the vehicle, as over the side of one of the crawlers. When a load is hoisted by a crane with the boom so disposed, the vehicle elements supported by and in contact with the crawler belt, such as idler wheels and track rollers, provide a tipping fulcrum between the load and the center of gravity of the vehicle. When the load exceeds a certain proportion of the weight of the vehicle, an unbalanced condition results tending to tip the vehicle over on its side. To counteract such an unbalanced condition, it is customary to use a counterweight disposed on that end of the vehicle opposite to the boom. However, there are practical limitations as to the amount of counterweight which can be used with any vehicle in attempting to increase its lifting capacity while maintaining vehicle stability.

Another method of counteracting such a laterally-unbalanced condition is to provide externally-mounted, laterally-projecting outriggers. Such outriggers are cumbersome, require heavy support arms and some form of ground-engaging base of substantial area, and unnecessarily increase the operating width and weight of the vehicle. To effectively use such outriggers, the vehicle must be positioned away from the work area an additional distance to accommodate the added width of such outriggers.

Accordingly, it is an object of the present invention to increase the effective capacity and maintain the lateral stability of a crawler-mounted crane by means of stabilizers which provide a tipping fulcrum disposed from the center of gravity of the vehicle at a greater distance than the vehicle elements supported by the crawler belt, yet do not increase the operating width of the vehicle.

It is another object of the invention to provide a stabilizer for a crawler vehicle which uses a portion of the crawler belt, or track, as a ground-engaging support.

In the drawings:

FIGURE 1 is a side elevational view of a crawler vehicle showing only a portion of the vehicle chassis and provided with stabilizers embodying the present invention.

FIGURE 2 is a cross-sectional view taken on line 2—2 of FIGURE 1.

FIGURE 3 is like FIGURE 2 but showing a second embodiment of the invention.

A conventional crawler traction belt, or track, 11 is shown in FIGURE 1 comprising a plurality of crawler pads, or shoes, 12 pivotally interconnected by means of pins 13. The crawler belt is trained over two spaced vehicle wheels 14, only one of which is usually a driving wheel. The wheels are secured to a track frame 15 which supports the vehicle chassis, a portion of which is indicated at 16. To spread the weight of the vehicle over the length of that portion of the track which is in contact with the ground, a plurality of track rollers 17 are provided at selected, spaced distances along the track frame and engage the track 11 approximately midway between its lateral edges.

A pair of such crawler tracks are arranged in a parallel manner on opposite sides of the vehicle to provide a substantially stable platform when the vehicle is subjected to a force tending to tip the vehicle in a plane parallel to the longitudinal axes of the crawler tracks. Such a force may be exerted on the vehicle when it is provided with a projecting crane boom or lifting device disposed in a plane substantially parallel to the said longitudinal axes.

However, the lateral distance between the tracks is usually less than the effective ground-engaging length of the track belts. This results in the vehicle being less stable in a lateral plane which limits the lifting capacity of the vehicle when the boom or other lifting device is disposed in a plane substantially normal to the longitudinal axes of the tracks. This limitation of laterally stability is critical in vehicles having a rotatable crane mounted thereon, as well as crawler tractors provided with a side-boom used in pipe-laying projects, as for example, the type disclosed in U.S. Patent No. 2,712,873.

To permit maximum maneuverability of a crawler-mounted vehicle, the vehicle wheels as well as the track rollers are usually disposed approximately midway between the lateral edges of their respective crawler belts. Accordingly, with a crane boom positioned over one of the crawler belts, the outermost contact line between the crawler belt and the rotatable vehicle-supporting elements, such as the wheels and track rollers, provide a tipping fulcrum for the weight of the load suspended by the crane boom. With the present invention the tipping fulcrum is moved outwardly from the longitudinal centerline of the vehicle and permits the utilization of the extreme laterally-projecting portion of the crawler belt as a stable supporting base for the vehicle.

The stabilizers which provide this laterally-extended tipping fulcrum each comprise a laterally-projecting support member 20 operatively connected to the track frame, as by means of bolts 21. A vertically extensible member 22 carried by the support member is provided with an enlarged lower portion 23 which serves as a pressure member adapted to contact the upper side of that section of the track which is in engagement with the ground. The support bracket 20 of the embodiment shown in FIGURES 1 and 2 is provided with internal threads adapted to receive a threaded extensible member 22 carrying an enlarged lower portion 23. To facilitate rotation of the extensible portion of the stabilizer means are provided such as apertures 27 adapted to receive a suitable lever. The lower portion of the stabilizer is preferably rotatably mounted on the extensible member by means of a semi-spherical head received in a cooperating socket in the pressure member 23. Locking means, such as pins 24 received in an annular groove 25 in the extensible member, retain the pressure member on the stabilizer. To insure that the pressure member, or shoe, of the stabilizer is in proper alignment with the crawler belt at all times to utilize the entire area of the shoe, guide means such as arms 26 may be provided which slide in contact with the support bracket as the extensible member is raised and lowered.

The second embodiment of the invention, as shown in FIGURE 3, uses an hydraulic cylinder 21a as the extensible member of the stabilizer. The cylinder is secured to the track frame 15 by means of mounting bracket 20a and thereby positions a pressure shoe 23a carried on extending piston rod 21b over the extreme lateral edge of track 11. A source of fluid pressure may be provided on the vehicle itself and remotely controlled to extend and retract each stabilizer.

Performance tests of the invention disclosed have shown that the lateral stability of a commercial crawler-mounted crane can be improved to the extent that its capacity can be increased as much as 15%, depending upon the width of the track. The procedures set forth in Commercial Standard CS90–58 prepared by the United States Department of Commerce were followed in performing capacity tests with the crane in its least stable position i.e., the longitudinal axis on the revolving superstructure at right angles to the crawler tipping fulcrum nearest the center of rotation. A crane having its revolving superstructure in this position is similar to a crawler-mounted pipe-laying tractor provided with a side boom. Accordingly, the invention provides a stabilizer adaptable for use with existing crawler-mounted vehicles which will increase the lateral stability without increasing their operating width nor adding unnecessary weight.

Having now described and illustrated one form of the invention, it is to be understood that this invention is not to be limited to the specific form or arrangement of parts herein described and shown.

What is claimed is:

1. In a crawler-mounted vehicle having a pair of track frames for supporting the vehicle chassis and disposed at the sides of the vehicle, a pair of wheels rotatably attached to each of said track frames, a plurality of track rollers rotatably attached to each of said frames and located in longitudinal alignment between said pair of wheels, and an endless track trained over each pair of said wheels and said plurality of track rollers, said endless track extending laterally on both sides of said wheels and said plurality of track rollers, the combination of: a stabilizer means connected to each of said track frames outwardly of said wheels and track rollers for augmenting the lateral stability of the vehicle, said stabilizer means including a laterally-projecting support member, a vertically extensible member carried by said support member and provided with a longitudinally extending lower portion for engagement with the upper-outward portion of said endless track, said vertical extensible member having an inoperative position above said track, and an operative position wherein said longitudinal portion engages said upper-outward portion of said endless track outwardly of said track rollers to provide a tipping fulcrum for the vehicle outwardly of said track rollers, and means for extending said vertical extensible member to said operative position.

2. The combination of claim 1 wherein said vertical extensible member includes a hydraulic cylinder having an extensible piston rod for positioning said longitudinally extending lower portion from said inoperative to operative position.

3. In a crawler-mounted vehicle having a pair of track frames for supporting the vehicle chassis and disposed at the sides of the vehicle, a pair of wheels rotatably attached to each of said track frames, a plurality of track rollers attached to said frame for rotation thereunder and longitudinally aligned with each of said pair of wheels, and an endless track trained over each pair of said wheels and engageable with said track rollers, each endless track extending laterally on both sides of said wheels and track rollers; the combination of: a lateral support member secured to each of said track frames outwardly of said track rollers, a vertically extensible member adjustably secured outwardly on said lateral support member, a longitudinally extending pressure shoe rotatably mounted on the lower end of said vertical extensible member for engagement with an upper-outward portion of said endless track, guide means associated with said pressure shoe to maintain its position relative to the upper-outward portion of said endless track, and means for extending and retracting said vertical extensible member toward and away from said endless track, whereby engagement of said pressure shoe with said endless track outwardly of said track rollers provides a tipping fulcrum for said vehicle outwardly of said track rollers in engagement with said endless track.

References Cited in the file of this patent

UNITED STATES PATENTS

| | | |
|---|---|---|
| 1,606,771 | Mitchell | Nov. 16, 1926 |
| 2,535,254 | Attwell | Dec. 26, 1950 |
| 2,558,686 | Hubbard | June 26, 1951 |
| 2,564,169 | Morgan et al. | Aug. 14, 1951 |